Feb. 3, 1959  A. BARTELS ET AL  2,871,507
APPARATUS FOR FEEDING FISH-DRESSING MACHINES
Filed Aug. 20, 1956
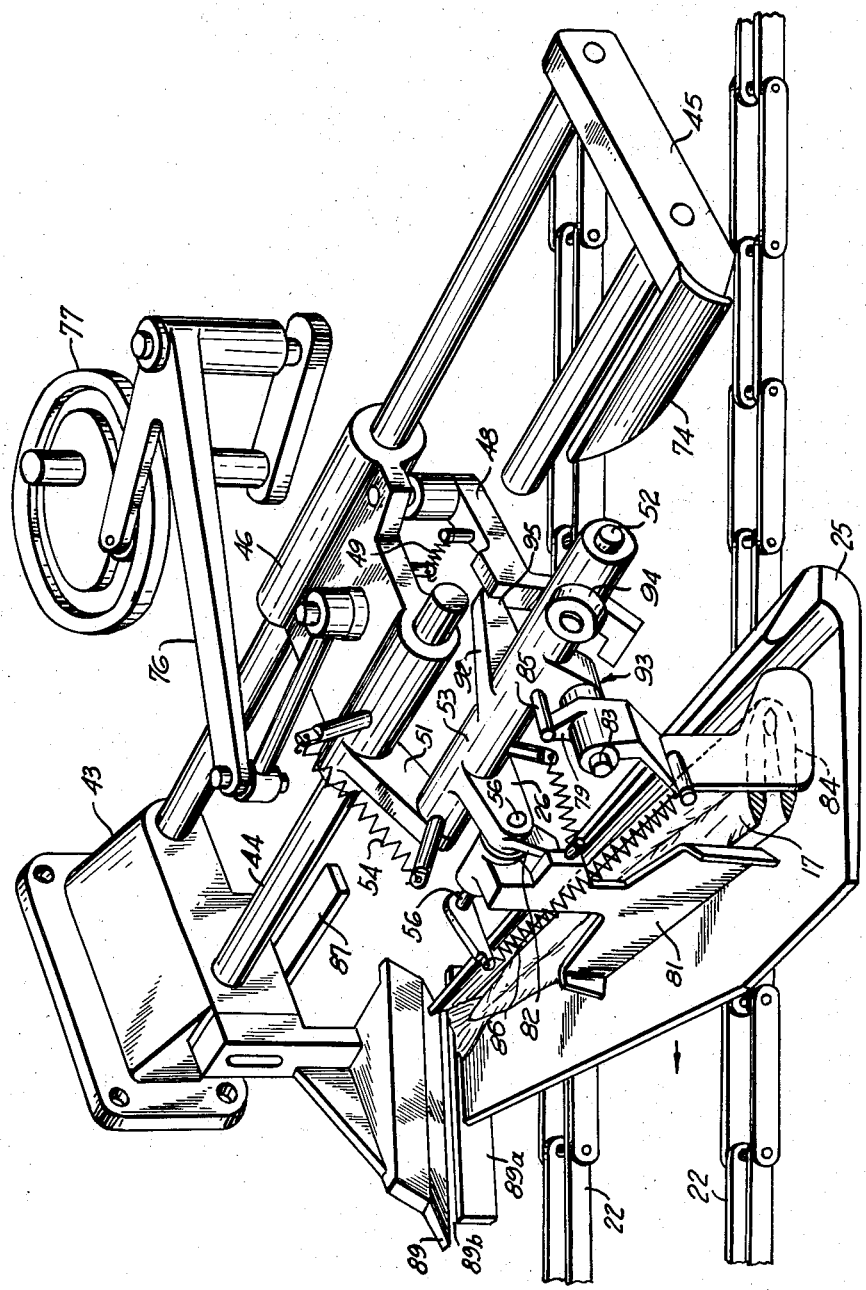
INVENTORS:
A. Bartels and P. Jobmann
BY
Richards & Geier
ATTORNEYS United States Patent Office 2,871,507
Patented Feb. 3, 1959

2,871,507
APPARATUS FOR FEEDING FISH-DRESSING MACHINES

Alfred Bartels and Paul Jobmann, Lubeck, Germany, assignors to Nordischer Maschinenbau Rud. Baader, Lubeck, Germany, a firm Application August 20, 1956, Serial No. 605,056

3 Claims. (Cl. 17—2)

The invention relates to a method for feeding fish in a fish dressing machine, wherein the fish are first decapitated and then gripped by tail grippers and presented to the other tools by these grippers. The decapitated fish lies on its side on a conveyor transversely to the direction of movement and an an angle thereto with its tail in advance and is pushed tail first in the direction of movement, the amount of displacement being controlled by the tail, whereupon it is gripped on the tail by a tail gripper, pulled out of the conveyor and fed to the dressing tool or tools.

This method as carried out up to the present is open to a number of objections which make its use difficult. Primarily the transverse displacement of the fish presents difficulties because when shifting in the direction of the tail, the tool for effecting the displacement cannot, owing to the fact that the cross-section of the fish decreases towards the tail, find a satisfactory point at which it can engage the fish on the outer side. The position here differs fundamentally from that when the fish is displaced head on, when for example the gills offer good possibilities for the engagement of the displacing tool.

It has therefore been endeavoured to shift the fish in the direction of the tail by engagement in the belly cavity the tail end of which constitutes a good point for the engagement of the displacing tool. This endeavour, however, did not prove satisfactory, because it was necessary to swing the displacing tool into the belly cavity which required complicated mechanism and moreover the effect was by no means reliable because the tool was not always introduced successfully into the belly cavity. Moreover the method can only be employed when the belly cavity is opened and widened.

It has now been discovered that these difficulties can easily be overcome if the transverse displacement is effected by engaging the surface produced by the decapitation of the fish. In this case it is possible to effect the transverse displacement independently of whether the belly cavity has been opened up or not. Moreover the engagement on the nape end can be carried out with extraordinarily simple and reliably operating mechanism, because the displacement tool has a reliable bearing point and merely pushes the fish before it.

Details of the invention will become clear from the following description of one possible form of construction of the apparatus for carrying out the method and which is illustrated in perspective view in the accompanying drawing.

The apparatus is arranged above a conveyor which consists of a number of troughs 25 which are mounted on chains 22 and move therewith. When a trough carrying the fish 17 reaches the apparatus the fish is already decapitated and is moved in its longitudinal direction. For this purpose a pusher element 84 is brought into engagement with the nape end of the fish and a flap 81 bears against the belly cavity of the fish.

The pusher element 84 and the flap 81 are both carried by a sleeve 53 rotatable on a pin 52 mounted in an arm 51 of the reversing carriage 46. This carriage 46 can slide freely on rods or guides 44 mounted at one end above and at an incline to the conveyor in a bracket or support 43 and connected at their free ends by a cross-piece 45. The carriage carries out its reverse movement in synchronism with the movement of the conveyor with the aid of a cam plate 77 cooperating with a follower mounted on one arm of an elbow lever 76 the other arm of which is linked to the carriage by a lever 75. The sleeve 53 has an arm 92 which in one position bears against a shoulder 95 on a horizontal lever 48 and is held in contact therewith by a spring 54 tending to urge the sleeve to turn in clockwise direction. An arm 26 on the sleeve 53 carries a pin 56 on which a flap 81 can swing under or against the action of a tension spring 59; the inward movement of the flap into contact with the fish is limited by a nose 82 on the arm 26 against which the flap strikes. The sleeve 53 also carries a pin 83 on which the pusher element 84 can swing, whereby the element is urged to turn in clockwise direction under the action of a spring 86, its movement in this direction being limited by the cooperation of a nose 79 on the pusher element with an abutment 85 on the sleeve 53.

When a trough 25 carrying a fish 17 is moved with the aid of the chains 22 up to the apparatus, the flap 81 is in a position bearing against the belly cavity of the fish and presses the fish firmly against the wall of the trough. In the drawing the machine is in this position and the shifting device is just about to commence its working stroke. When the carriage 46 commences to move along the rods 44 on the bracket 43, it brings the pusher member 84 into contact with the nape end of the fish which is thereby pushed tail first towards a slot 89b between two parts of a member 89, 89a. The tail enters this slot and the movement of the fish continues until the root of the tail fills the slot in vertical direction, the movement of the fish being thereby arrested. The carrier 46, however, continues its movement towards the bracket 43 and the pusher element 84 swings in counterclockwise direction over the nape surface and slides along the side of the fish.

The whole shifting apparatus is at an incline to the direction in which the fish is transported and the movements are so synchronized that the pusher element 84 slides along the conveyor trough at a constant distance from the wall thereof.

At the end of the movement the element must be swung out of the range of the trough to enable the trough to move back under the push element. This swing movement is effected by the sleeve 53 which turns under the action of the spring 54, to allow the shoulder 95 to be shifted out of its position under the arm 92. An abutment 87 is provided in the path of the lever 48 so that the latter must swing out in counterclockwise direction towards the rear end of the operating path of the shifting apparatus. Thus this sleeve 53 can turn and lift the flat 81 and the push element 84 over the wall of the trough. The turning movement of the sleeve 53 is limited by a shoe 93 on the lever 48 which is wider than the shoulder 95 and comes into contact with the arm 92. During the return movement of the shifting apparatus these different parts return into their initial positions by the cooperation of a roller 94 on the sleeve 53 with a rigid cam 74, with the result that the sleeve is turned against the action of the spring 54 and the lever 48 moves in clockwise direction under the action of the spring 49 bringing the arm 92 on to the shoulder 95.

We claim:

1. A fish feeding machine, comprising a movable conveyor, troughs carried by said conveyor and extending transversely to the direction of movement thereof, each of said troughs being adapted to receive a decapitated fish located lengthwise upon said trough, a support, guides carried by said support, a carriage mounted upon said guides, a pusher, means pivotally and resiliently supporting said pusher above said troughs for reciprocation lengthwise of the troughs, means pivotally and resiliently connecting the first-mentioned means with said carriage for a swinging movement of said pusher away from the troughs, means reciprocating said carriage upon said guides to cause said pusher to engage the decapitated end of a fish body located upon a trough and push it toward one end of the trough, a device located adjacent said one end of the trough and receiving the tail end of the fish body, said pusher swinging over the fish body upon resistance of the fish body caused by engagement with said device, means connected with said carriage for locking the second-mentioned means during the movement of the pusher toward said device, and means releasing the second-mentioned means upon completion of this movement to cause the pusher to swing away from the trough.

2. A fish feeding machine, comprising a movable conveyor, troughs carried by said conveyor and extending transversely to the direction of movement thereof, each of said troughs being adapted to receive a decapitated fish located lengthwise upon said trough, a support, guides carried by said support and extending substantially transversely to the direction of movement of said conveyor, a carriage mounted upon said guides for reciprocable movement thereon, means connected with said carriage for reciprocating said carriage, an arm carried by said carriage, a pin carried by said arm, a sleeve rotatably mounted upon said pin, resilient means interconnecting said sleeve and said carriage, another pin carried by said sleeve, a pusher carried by said other pin above said troughs, resilient means connecting said pusher with said sleeve, whereby reciprocation of said carriage causes said pusher to engage the decapitated end of a fish body located upon a trough and push it toward one end of the trough, a device located adjacent said one end of the trough and receiving the tail end of the fish body, the last-mentioned resilient means causing said pusher to swing over the fish body upon resistance of the fish body caused by engagement with said device, means connected with said carriage for locking the second-mentioned means during the movement of the pusher toward said device, and means releasing the second-mentioned means upon completion of this movement to cause the pusher to swing away from the trough.

3. A fish feeding machine, comprising a movable conveyor, troughs carried by said conveyor and extending transversely to the direction of movement thereof, each of said troughs being adapted to receive a decapitated fish located lengthwise upon said trough, a support, guides carried by said support and extending substantially transversely to the direction of movement of said conveyor, a carriage mounted upon said guides for reciprocable movement thereon, means connected with said carriage for reciprocating said carriage, a sleeve, means pivotally and resiliently connecting said sleeve with said carriage, a pin carried by said sleeve, a pusher carried by said pin above said troughs, resilient means connecting said pusher with said sleeve, whereby reciprocation of said carriage causes said pusher to engage the decapitated end of a fish body located upon a trough and push it toward one end of the trough, a device located adjacent said one end of the trough and receiving the tail end of the fish body, the last-mentioned resilient means causing said pusher to swing over the fish body upon resistance of the fish body caused by engagement with said device, an arm carried by said sleeve, a lever pivotally mounted upon said carriage and having a recess engaged by said arm for locking said sleeve against upward movement during the movement of the pusher toward said device, and an abutment engaging said lever and moving it out of engagement with said arm upon completion of the movement of the pusher toward said device to cause said pusher and said sleeve to swing away from the trough.

References Cited in the file of this patent
UNITED STATES PATENTS

| | | |
|---|---|---|
| 2,584,567 | Fonken et al. | Feb. 5, 1952 |
| 2,680,876 | Oates | June 15, 1954 |